E. C. BURLINGAME.
TANK FILLER.
APPLICATION FILED FEB. 16, 1915.
1,175,233.
Patented Mar. 14, 1916.
2 SHEETS—SHEET 1.
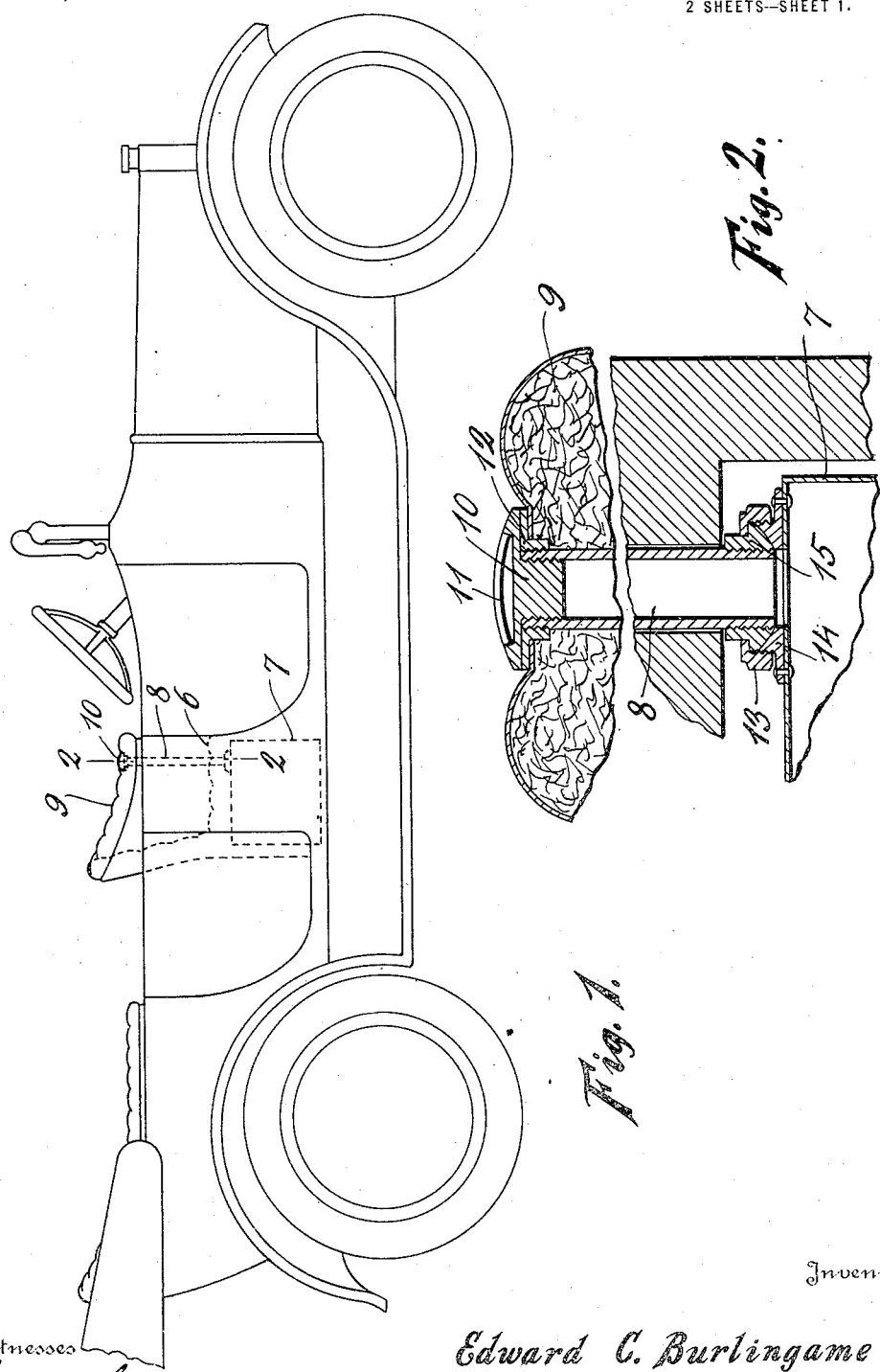
Witnesses
Einar Larson
J. M. Miller
Inventor
Edward C. Burlingame
By Max A. Schmidt
Attorney

E. C. BURLINGAME.
TANK FILLER.
APPLICATION FILED FEB. 16, 1915.

1,175,233.

Patented Mar. 14, 1916.
2 SHEETS—SHEET 2.

Witnesses
Einar Larson
J. M. Miller

Inventor
Edward C. Burlingame
By Max A. Schmidt
Attorney

UNITED STATES PATENT OFFICE.

EDWARD C. BURLINGAME, OF WALLA WALLA, WASHINGTON.

TANK-FILLER.

1,175,233. Specification of Letters Patent. Patented Mar. 14, 1916.

Application filed February 16, 1915. Serial No. 8,688.

*To all whom it may concern:*

Be it known that I, EDWARD C. BURLINGAME, a citizen of the United States, residing at Walla Walla, in the county of Walla Walla and State of Washington, have invented certain new and useful Improvements in Tank-Fillers, of which the following is a specification.

This invention relates to tanks carried by automobiles and other motor vehicles for holding the supply of gasolene or other liquid fuel of the engine. Such tanks are usually mounted beneath the front seat of the car, so that when the tank needs filling, the driver and other occupant of the seat must get up and out of the car, and the seat cushion must be removed, before access to the filler nipple of the tank may be had.

The invention has for its object to provide a filler device which is so arranged that the tank can be easily and conveniently filled without lifting the seat cushion, or without the occupants of the seat leaving the car.

A further object of the invention is to provide a filler device which is so constructed and arranged that it will not interfere with the use of a measuring stick to measure the contents of the tank.

The herein stated objects are attained by means of a novel combination and arrangement of parts to be hereinafter described and claimed, reference being had to the accompanying drawings, in which —

Figure 3:
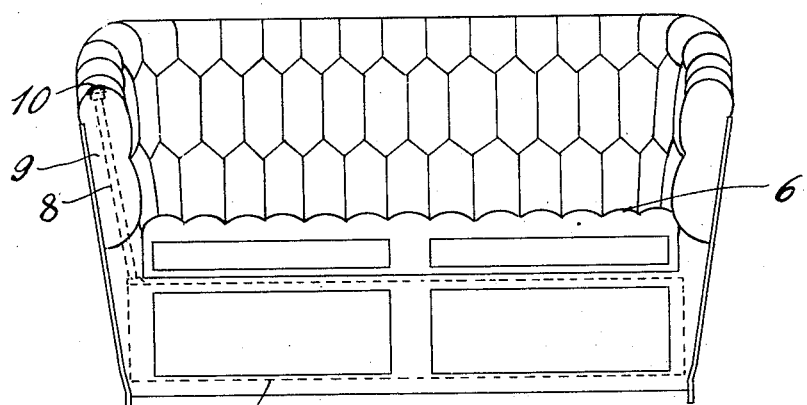
Figure 4:
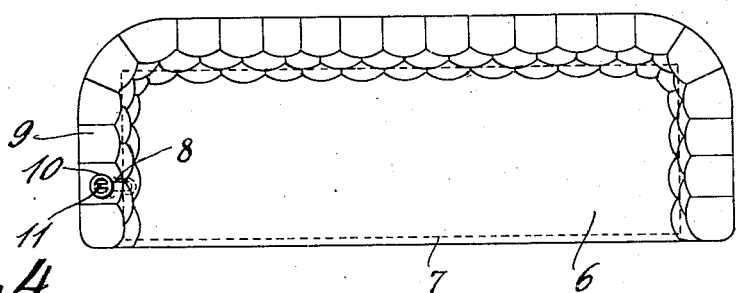
Figure 5:
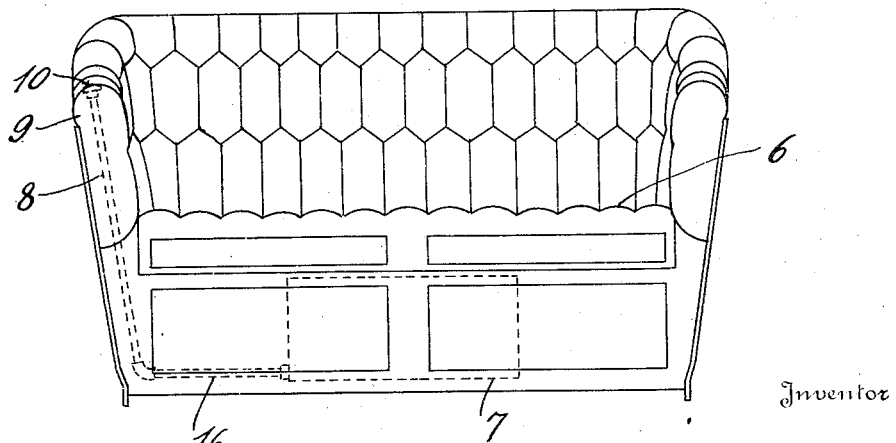

Figure 1 is a side elevation of an automobile showing the application of the invention; Fig. 2 is a sectional detail on the line 2—2 of Fig. 1; Fig. 3 is a front elevation of the seat showing the location of the filler device with respect thereto; Fig. 4 is a plan view of the seat and Fig. 5 is a front elevation of the seat showing a different arrangement of filler pipe.

Referring specifically to the drawings, 6 denotes the front seat of an automobile, beneath which seat is mounted the gasolene tank 7, said tank having a filler pipe 8. This pipe is permanently built into one of the sides 9 of the seat, so that the occupants of the seat need not go to the trouble of lifting the seat cushion and get out of the car when the tank is to be filled. The pipe extends vertically from the top edge of the seat side, and straight down to the top of the tank, adjacent to one end of which it is suitably connected. The upper or inlet end of the pipe has a closure in the form of a screw cap 10 provided with a cross-piece 11 to facilitate the application of a wrench. This end of the pipe also carries a lock nut 12 which is screwed down against the upholstering of the seat side. The cap 10 is made to fit into and conform to the upholstering so that it will not mar the appearance of the seat, or interfere with the arm of the occupant thereof. The lock nut firmly connects the upper end of the pipe to the upholstering. The connection of the filler pipe with the tank is made by means of a union nut 13 screwed on a nipple 14 on the tank, and engaging a coupling ring 15 on the pipe. Any other suitable connection may be provided. If the tank 7 does not extend over as far as the seat side 9, the filler pipe 8 is provided at its lower end with a lateral horizontal extension 16 connected to one end of the tank at the bottom thereof, as shown in Fig. 5.

By the filler device hereinbefore described it is not necessary for the occupants of the seat to leave the same, nor to raise the seat cushion when the tank is to be filled. All that is necessary is to remove the cap 10 and let the person who is delivering the gasolene pour the same into the pipe 8. There is no loss of time or inconvenience by this method of filling the tank, and after the tank is filled the cap is replaced, and the car may proceed.

In both embodiments of the invention the contents of the tank may be measured in the usual way by inserting a measuring stick into the filler pipe. It will be noted that the lower end of the filler pipe shown in Fig. 5 extends down to a point on a level with the bottom of the tank, so that when the measuring stick is inserted it will correctly indicate the gasolene level in the tank.

The filler pipe may be permanently built in the side of the seat when the same is manufactured, and it is fixed so that it cannot possibly come loose.

I claim:

The combination with the seat of a motor vehicle, and a fuel tank mounted beneath said seat; of a filler pipe for the tank housed in one of the sides of said seat, one end of the pipe extending below the seat and being connected to the tank, and its opposite end being at the top of the edge of the aforesaid seat side and having a closure thereat, said filler pipe extending upward from the tank in a straight line.

In testimony whereof I affix my signature in presence of two witnesses.

EDWARD C. BURLINGAME.

Witnesses:
E. E. SAUGE,
MARVIN EVANS.